United States Patent [19]

Roberts

[11] 4,249,646
[45] Feb. 10, 1981

[54] DRUM BRAKE ASSEMBLY WITH NON-SERVO AND DUO-SERVO CHARACTERISTICS

[75] Inventor: James K. Roberts, South Bend, Ind.

[73] Assignee: The Bendix Corporation, Southfield, Mich.

[21] Appl. No.: 12,991

[22] Filed: Feb. 21, 1979

[51] Int. Cl.³ .............................................. F16D 51/22
[52] U.S. Cl. .................................. 188/328; 188/331; 188/341; 192/75
[58] Field of Search ............... 188/341, 328, 331, 325, 188/106 F, 106 A; 192/75

[56] References Cited

U.S. PATENT DOCUMENTS

| 2,775,315 | 12/1956 | Maruhn et al. ................. | 188/331 |
| 3,951,243 | 4/1976 | Chouings ......................... | 188/331 X |

FOREIGN PATENT DOCUMENTS

| 1000246 | 1/1957 | Fed. Rep. of Germany ........... | 188/341 |
| 484699 | 9/1953 | Italy ......................................... | 188/341 |
| 485920 | 10/1953 | Italy ......................................... | 188/341 |
| 702141 | 1/1954 | United Kingdom ................. | 188/106 A |

*Primary Examiner*—George E. A. Halvosa
*Attorney, Agent, or Firm*—Paul David Schoenle; Ken C. Decker

[57] ABSTRACT

In a drum brake assembly a hydraulic actuator is engageable with a pair of brake shoes to move the same into engagement with a rotatable member. A parking lever also cooperates with the pair of brake shoes to move the same into engagement with the rotatable member and an anchor plate forms a connecting member between the pair of brake shoes. A backing plate supports the pair of brake shoes and the anchor plate. The anchor plate is movably supported by the backing plate and a latch cooperates with the anchor plate in a first position to fix the anchor plate to the backing plate. The latch is movable to a second position spaced from the anchor plate to permit the latter to move relative to the backing plate. In order to control the position setting of the latch, the latch is coupled to the parking lever so that the latch remains in the first position until the parking lever is moved whereupon the latch is also moved to the second position. Consequently, when the hydraulic actuator is operated in a service brake application, the anchor plate remains fixed to the backing plate to form a nonservo drum brake and when the parking brake is operated, the anchor plate is movable with the pair of brake shoes in the direction of the rotatable member to form a duo-servo drum brake.

10 Claims, 4 Drawing Figures

DRUM BRAKE ASSEMBLY WITH NON-SERVO AND DUO-SERVO CHARACTERISTICS

BACKGROUND OF THE INVENTION

A non-servo drum brake assembly includes an anchor plate for pivotally mounting adjacent ends of a pair of brake shoes. A hydraulic actuator is engageable with the pair of brake shoes to pivot the same radially outwardly about the anchor plate so as to engage the pair of brake shoes with a rotatable member.

A duo-servo drum brake assembly includes a connecting member, such as an extendible adjuster, between adjacent ends of a pair of brake shoes. The connecting member is a floating member relative to the backing plate so that the pair of brake shoes and connecting member move or rotate with the rotatable member through a slight arcuate angle during braking. This slight arcuate movement of the pair of brake shoes results in one of the pair of brake shoes being biased into engagement with the rotatable member by the slight movement of the other brake shoe. As a result the duo-servo brake is more efficient than the non-servo brake under similar operating conditions.

With the increase in front wheel drive for motor vehicles, disc brakes on the front wheel and drum brakes on the rear wheel are becoming very common. Moreover, the disc brakes on the front wheel are more than adequate to control braking for the motor vehicle so that the drum brakes on the rear wheel are not required to absorb a majority of the kinetic energy of the moving car. In fact, if the rear drum brake is too efficient, a service brake application will cause the rear wheels to lock up, thereby creating a dangerous driving condition. In general, non-servo drum brakes are used on the rear wheels.

Although the non-servo rear drum brake is suitable during a service brake application, because the front disc brake is doing most of the braking, a parking brake application presents a different situation as only the rear brake is utilized. Consequently, a rear drum brake which is designed as a supporting brake during a service brake application is relied on to totally perform braking for a motor vehicle during a parking brake application.

SUMMARY OF THE INVENTION

The present invention relates to a drum brake assembly which substantially defines a non-servo drum brake during a service brake application and converts to a duo-servo drum brake during a parking brake application. A pair of brake shoes are engageable with a hydraulic actuator to pivot relative to an anchor plate releasably secured to a backing plate which supports the pair of brake shoes.

In accordance with the invention a latch is engageable with the anchor plate in a first position to fixedly connect the anchor plate to the backing plate. The latch is movable to a second position to permit the anchor plate to move relative to the backing plate so that the anchor plate is free to rotate slightly with the pair of brake shoes in the direction of a rotatable member to be braked. The latch is resiliently coupled to a parking lever to move to the second position spaced from the anchor plate when the parking lever is actuated.

In particular the backing plate is formed to define a slot which movably receives the anchor plate and a cutout on the anchor plate receives the latch in its first position such that the latch opposes the backing plate and the anchor plate.

It is an object of the present invention to provide a drum brake assembly which operates in a non-servo mode under one set of circumstances and a duo-servo mode under another set of circumstances.

More particularly, it is an object of the invention to provide a non-servo drum brake assembly which is responsive to actuation of a parking lever to convert to a duo-servo drum brake.

DETAILED DESCRIPTION

Figure 1:
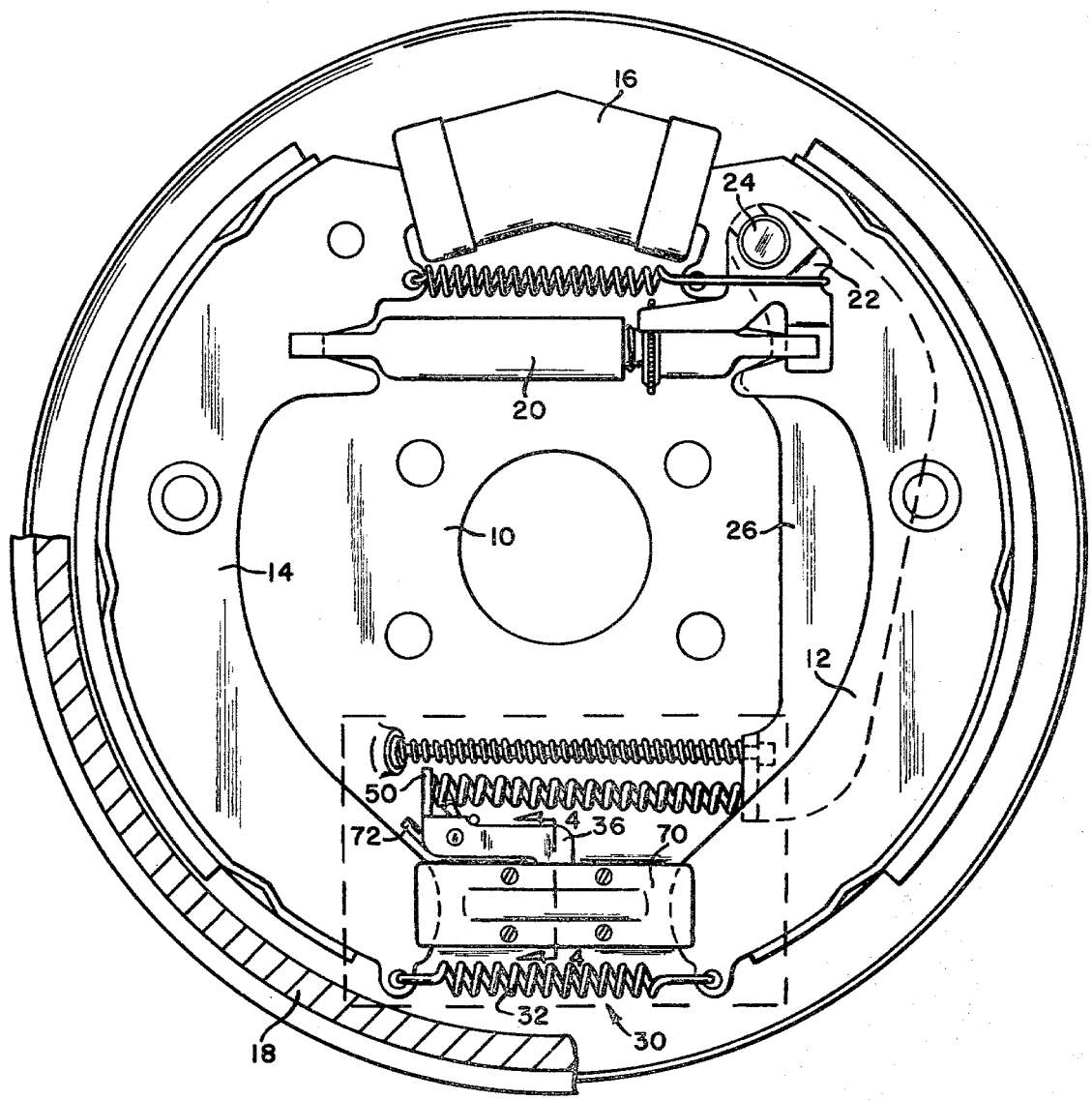
FIG. 1 is a front view of a drum brake assembly constructed in accordance with the present invention.

In the drum brake assembly of FIG. 1 a backing plate 10 supports a pair of brake shoes 12 and 14 and a hydraulic actuator 16 cooperates with the pair of brake shoes 12 and 14 to urge the latter to move into engagement with a rotatable member 18 during a service brake application. An extendible strut 20 is engageable with the pair of brake shoes to compensate for lining wear. A pin 24 extends from the brake shoe 12 to pivotally mount a pawl 22, cooperating with the extendible strut 20, and also to pivotally mount a parking lever 26. The pawl 22 provides for extension of the extendible strut 20 while the parking lever 26 is pivotal about the pin 24 to move the pair of brake shoes 12 and 14 into engagement with the rotatable member 18 during a parking brake application.

Figure 3:
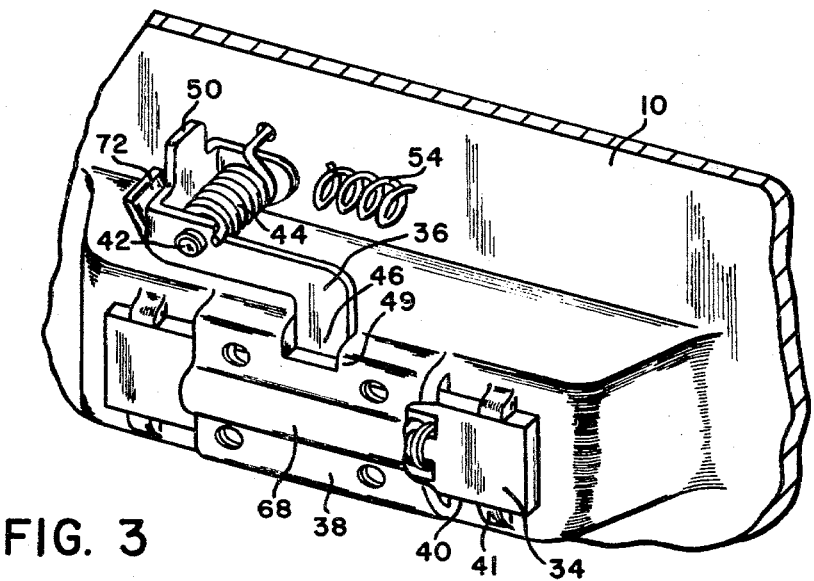
FIG. 3 is a perspective view of the encircled portion of FIG. 1.
Figure 2:
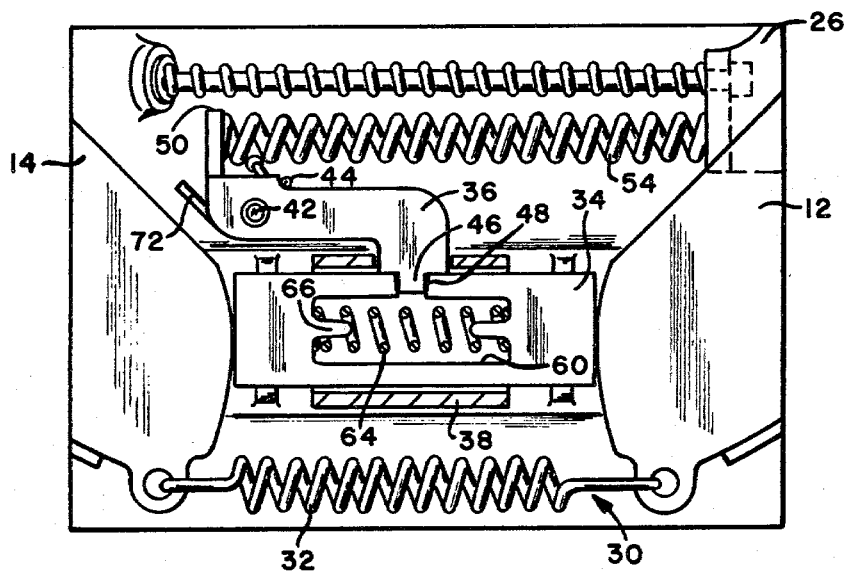
FIG. 2 is an enlarged front view of the encircled portion of FIG. 1 with a hold-down plate removed and a portion of the backing plate in cross section.

Turning to FIGS. 2 and 3, the ends of the pair of brake shoes opposite the hydraulic actuator 16 are retained in pivotal engagement with an anchor assembly 30 by a return spring 32. The anchor assembly 30 includes an anchor plate 34 and a latch 36. In order to movably support the anchor plate 34 on the backing plate 10, the backing plate 10 is stamped outwardly at 38 to define a slot 40 which receives the anchor plate 34. Optional tabs 41 are also stamped from the backing plate 10 to guide the movement of the plate 34 within the slot 40.

A pin 42 extends from the backing plate 10 to pivotally mount the latch 36 and a torsion spring 44 biases the latch 36 to pivot in a clockwise direction, viewing FIG. 2. The latch terminates in a pawl 46 and the anchor plate 34 is cut out at 48 to receive the pawl 46. In addition, the stamped portion 38 of the backing plate 10 is also cut out at 49 to receive the pawl 46.

The latch 36 includes a flange 50 defining an opening and a compression spring 54 terminates at one end in a projection extending into the opening 52. The other end of the spring 54 is connected to the parking lever 26. The force of spring 54 is weaker than the force of spring 44 when the parking lever 26 is in a non-operative position and stronger when the parking lever 26 is in an operative position.

When the pawl 46 of latch 36 is disposed within the anchor plate cutout 48, the anchor plate 34 is in a neutral position. An aperture 60 on the anchor plate 34 and an aperture 62 on the backing plate each receive a portion of a centering spring 64. The centering spring resiliently opposes movement of the anchor plate 34 away from its neutral position. Viewing FIG. 4, the centering spring 64 is retained within the apertures 60 and 62 by a pair of guides 66 on the anchor plate 34 extending into the aperture 60 and an arcuate groove 68 on the stamped-out portion 38.

Figure 4:
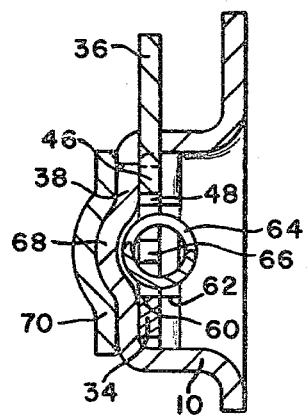
FIG. 4 is a cross-sectional view taken along line 4—4 of FIG. 1.

A hold-down plate 70, shown only in FIGS. 1 and 4, is attached to the backing plate portion 38 to oppose axial separation between the backing plate 10 and the pair of brake shoes 12 and 14 when the latter are engaged with the anchor plate 34.

A stop 72 on the latch 36 limits the counterclockwise rotation of the latch to a rotated position separating the pawl 46 from the cutout 48 on the anchor plate.

MODE OF OPERATION

When the brake is maintained in a non-operating condition, the torsion spring 44 overcomes the force of spring 54 to retain the pawl 46 of latch 36 within the cutout 48 and 49. Consequently, movement of the anchor plate within the slot 40 is prevented.

During a service brake application, the hydraulic actuator 16 receives pressurized fluid to move the pair of brake shoes radially outwardly. As a result the brake shoes pivot about the anchor plate 34 until the brake shoes frictionally engage the rotatable member 18. As the parking lever 26 is maintained in a nonoperating position, the torsional spring will more than offset the force of spring 54 to retain the pawl 46 within the slots 48 and 49. Consequently, during a service brake application, braking torque developed by the pair of brake shoes engaging the rotatable member will be transmitted to the anchor plate 34, which remains secured to the backing plate 10 via latch 36 and to the portion 38 of the backing plate 10.

When the parking lever 26 is rotated in a clockwise direction during a parking brake application, the spring 54 is further compressed to overcome the force of torsion spring 44 so that the latch 36 is rotated in a counterclockwise direction to separate the pawl 46 from the cutout 48. Continued rotation of the parking lever about the strut 20 and pin 22 moves the brake shoes 12 and 14 into engagement with the rotatable member 18. If the rotatable member 18 is rotated in either direction while the parking brake is applied, the brake shoes are free to rotate slightly with the rotatable member so as to urge one of the pair of brake shoes into tighter engagement with the rotatable member. This slight rotation is permitted because the anchor plate 34 is disengaged from the latch 36 to move freely within slot 40. The braking torque developed during a parking brake application is transmitted to the hydraulic actuator 16 and to the backing plate 10.

Rather than transmitting braking torque to the hydraulic actuator 16 during a parking brake application, it is possible to provide an anchor pin extending from the backing plate 10. The anchor pin would be engageable with the pair of brake shoes to oppose rotation of the pair of brake shoes with the rotatable member.

It is also possible to integrate the hold-down plate 70 with the stamped portion 38 cooperating with the pair of brake shoes to limit axial separation between the pair of brake shoes and the backing plate 10.

The foregoing description provides a drum brake assembly which operates as a non-servo drum brake during a service brake application and as a duo-servo drum brake during a parking brake application.

I claim:

1. In a drum brake assembly having a pair of brake shoes which are engageable with a rotatable member during a brake application, said brake shoes having pairs of confronting ends, an expansible actuator received between one pair of said confronting brake shoe ends to move said brake shoes into engagement with said rotatable member, a backing plate supporting the pair of brake shoes, a parking lever cooperating with the pair of brake shoes to move the latter into engagement with the rotatable member to effect a parking brake application responsive to movement of said parking lever to a brake applied position, characterized by means cooperating in a first position with the other pair of confronting brake shoe ends to pivotally anchor the pair of brake shoes to the backing plate, said means spacing apart said other pair of confronting brake shoes ends, said means further being responsive to movement of the parking lever to the brake-applied position to move to a second position to release the pivotal anchor between the pair of brake shoes and the backing plate, said means including a plate extending between and engageable with the other pair of confronting brake shoe ends to define a substantially invariant spacing between said other pair of confronting brake shoe ends, said plate being movably carried by said backing plate, and said means also including a latch cooperating with said plate to lock said plate to the backing plate when said means is in the first position, thereby preventing movement of said plate.

2. The drum brake assembly of claim 1 in which said latch is resiliently coupled to the parking lever.

3. In a drum brake assembly having a backing plate for movably supporting a pair of brake shoes, a connecting member extending between the pair of brake shoes to maintain a substantially invariant spacing therebetween and a parking lever cooperating with the pair of brake shoes to move the same to a braking position, characterized by means cooperating with the connecting member to lock the latter to the backing plate so as to prevent movement of the connecting member relative to the backing plate, said means being responsive to movement of the parking lever which moves the pair of brake shoes to a braking position to unlock the connecting member from the backing plate, thereby permitting the connecting member to move relative to the backing plate.

4. The drum brake assembly of claim 3 in which said means comprises a latch which is coupled to the parking lever.

5. The drum brake assembly of claim 4 in which said latch is pivotally secured to the backing plate.

6. In a drum brake assembly having a pair of brake shoes which are movable by a hydraulic actuator into engagement with a rotatable member during a service brake application, a lever cooperating with the pair of brake shoes to move the latter into engagement with the rotatable member during a parking brake application and a backing plate supporting the pair of brake shoes, characterized by the drum brake assembly including means for engaging and pivotally anchoring the pair of brake shoes to the backing plate during a service brake application, said means defining a fixed support relative to the backing plate during the service brake application irrespective of the direction of rotation of said rotatable member to transfer braking torque to the backing plate via said fixed support and to prevent at least one brake shoe from moving in the direction of rotation of the rotatable member, said means also being responsive to the parking brake application to free said fixed support and to permit the pair of brake shoes and said fixed support to move relative to the backing plate in the direction of rotation of the rotatable member.

7. The drum brake assembly of claim 6 in which said means comprises an anchor plate engageable with the pair of brake shoes and movably supported by the backing plate and a latch, said latch being movable from a first position engaging said anchor plate so as to fix said anchor plate to the backing plate to a second position spaced from said anchor plate so as to permit said anchor plate to move relative to the backing plate.

8. In a drum brake assembly having a pair of brake shoes which are movable into engagement with a rotatable member during a service brake application, a parking lever cooperating with the pair of brake shoes to effect a parking brake application, a backing plate supporting the pair of brake shoes and an anchor plate extending between and engageable with the pair of brake shoes characterized by latching means cooperating with the anchor plate to secure the latter to the backing plate in a first position for said latching means so as to prevent the anchor plate from moving in the first position during a service brake application and said latching means being movable to a second position responsive to movement of said parking lever which effects a parking brake application to permit the anchor plate to move relative to the backing plate during a parking brake application.

9. A drum brake comprising:
a rotatable brake drum;
a nonrotatable backing plate disposed adjacent to said brake drum;
a pair of arcuate brake shoes slidably supported on said backing plate and engageable with said brake drum to effect a brake application, said brake shoes having pairs of confronting ends;
an expansible hydraulic motor carried by said backing plate and engaging one pair of confronting brake shoe ends to move said one pair of brake shoe ends apart and effect a service brake application;
an anchor plate shiftably carried by said backing plate and pivotally engaging the other pair of confronting brake shoe ends, said anchor plate invariantly spacing apart said other pair of confronting brake shoe ends;
a strut received between and engaging said brake shoes adjacent to said hydraulic motor;
a parking brake lever pivotally connected to one of said brake shoes, said parking brake lever engaging said strut to force the one pair of confronting brake shoe ends apart to effect a parking brake application responsive to pivotal movement of said parking brake lever to a brake-applied position;
a latch carried by said braking plate and engageable with said anchor plate to lock the anchor plate to the backing plate during a service brake application;
means for connecting said latch to said parking brake lever to unlock said anchor plate from said backing plate responsive to movement of said parking brake lever to a brake-applied position, thereby unlocking said latch only during a parking brake application.

10. The drum brake of claim 9 wherein said latch includes a lever pivotally carried by said backing plate, said lever defining a pawl, said anchor plate defining a cutout in which said pawl is receivable, a torsion spring yieldably biasing said lever to a locking position in which said pawl is engaged with said cutout, and a resilient member connecting said lever to the parking brake lever to move said lever to an unlocked position in which said pawl is spaced from said cutout responsive to movement of said parking lever to a brake-applied position.

* * * * *